(12) United States Patent
Zhao et al.

(10) Patent No.: US 11,845,665 B2
(45) Date of Patent: Dec. 19, 2023

(54) PREPARATION METHOD OF POLYACRYLONITRILE-BASED THREE-DIMENSIONAL MACROPOROUS CARBON MONOLITH

(71) Applicant: SHANDONG UNIVERSITY, Shandong (CN)

(72) Inventors: Guoqun Zhao, Jinan (CN); Jie Gong, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 653 days.

(21) Appl. No.: 17/048,891

(22) PCT Filed: Aug. 31, 2018

(86) PCT No.: PCT/CN2018/103674
§ 371 (c)(1),
(2) Date: Oct. 19, 2020

(87) PCT Pub. No.: WO2019/218540
PCT Pub. Date: Nov. 21, 2019

(65) Prior Publication Data
US 2021/0163299 A1   Jun. 3, 2021

(30) Foreign Application Priority Data

May 18, 2018 (CN) .................. 201810479908.3

(51) Int. Cl.
| C01B 32/336 | (2017.01) |
| C01B 32/318 | (2017.01) |
| C08J 5/18 | (2006.01) |

(52) U.S. Cl.
CPC .......... *C01B 32/336* (2017.08); *C01B 32/318* (2017.08); *C08J 5/18* (2013.01); *C08J 2333/20* (2013.01)

(58) Field of Classification Search
CPC ..... C01B 32/336; C01B 32/318; C01B 32/05; C08J 5/18; C08J 2333/20; C08J 2201/034; C08J 2203/08; C08J 9/122
See application file for complete search history.

(56) References Cited

U.S. PATENT DOCUMENTS

2007/0277704 A1   12/2007   Lucas et al.

FOREIGN PATENT DOCUMENTS

| CN | 1303964 A | 7/2001 |
| CN | 1986491 A | 6/2007 |

(Continued)

OTHER PUBLICATIONS

Definition of application, accessed online at https://www.merriam-webster.com/dictionary/application on Jul. 29, 2023 (Year: 2023).*

(Continued)

*Primary Examiner* — Daniel C. McCracken
(74) *Attorney, Agent, or Firm* — Oliff PLC

(57) ABSTRACT

A preparation method of a polyacrylonitrile-based three-dimensional macroporous carbon monolith. The process route of the method includes the following steps: completely dissolving polyacrylonitrile in an organic solvent, then carrying out drying, cutting, hot-pressing and punching to obtain a foam precursor, next, preparing a polyacrylonitrile foam with a controllable pore structure by a supercritical carbon dioxide batch foaming method, and finally carrying out pre-oxidation and carbonization treatment to obtain the polyacrylonitrile-based three-dimensional macroporous carbon monolith. The preparation method of the polyacrylonitrile-based three-dimensional macroporous carbon monolith of the present invention is simple, easy to control, environmentally friendly and low in cost, thus, the present invention is conducive to large-scale production of the carbon monolith. The prepared polyacrylonitrile-based three-dimensional (Continued)

macroporous carbon monolith has the characteristics of uniform and controllable pore structure and good conductivity, and has a broad application prospect. The method has simple steps, convenient operation and high practicability.

5 Claims, 3 Drawing Sheets

(56) References Cited

FOREIGN PATENT DOCUMENTS

| CN | 103985881 A | 8/2014 |
|---|---|---|
| CN | 108383101 A | 8/2018 |

OTHER PUBLICATIONS

Wang, et al., Novelly developed three-dimensional carbon scaffold anodes from polyacrylonitrile for microbial fuel cells, J. Mater. Chem. A 2015; 3: 5110-5118 (Year: 2015).*

Jan. 25, 2019 International Search Report Issued In International Patent Application No. PCT/CN2018/103674.

Jan. 25, 2019 Written Opinion of the International Searching Authority issued in International Patent Application No. PCT/CN2018/103674.

* cited by examiner

US 11,845,665 B2

PREPARATION METHOD OF POLYACRYLONITRILE-BASED THREE-DIMENSIONAL MACROPOROUS CARBON MONOLITH

BACKGROUND

Technical Field

The present invention relates to a preparation method of porous carbon, in particular to a preparation method of a polyacrylonitrile-based three-dimensional macroporous carbon monolith.

Related Art

Porous carbon materials are widely used in many applications, including electrode materials of fuel cells, double electric layer capacitors and lithium ion batteries, catalyst carriers, electromagnetic shielding materials, water purification and filtration materials, and sound-absorbing materials, due to their advantages of rich porous structure, large specific surface area, low density, excellent chemical stability, good electrical conductivity, low production cost, and so on. The pore structure is a key factor affecting the application of porous carbon materials. Controllable preparation of macropores is the key to obtaining three-dimensional monolithic carbon materials. However, most of the currently prepared macroporous carbon materials have problems such as extremely uneven pore size, pore size distribution and spatial arrangement, or only a certain amount of ordered pore structures on the surfaces. It is difficult to obtain three-dimensional overall macroporous structure materials. The problems of chaotic pore structures and high processing costs of the currently prepared macroporous carbon materials limit the further research and application of three-dimensional macroporous carbon monoliths.

Among many carbon precursors, polyacrylonitrile is an excellent carbon precursor that accounts for more than 90% of the total carbon fiber market because of its advantages of simple molecular structure, controllable carbonization degree, high carbon yield, excellent mechanical properties and low raw material cost. However, as the softening temperature and decomposition temperature of polyacrylonitrile are very close, the melting point is high, and the viscosity is high, existing processing methods for polyacrylonitrile are very limited.

So far, in order to obtain polyacrylonitrile-based three-dimensional macroporous carbon monoliths with a controllable structure, researchers have proposed many different methods. These methods are divided into two types, a templating method and a template-free method. The templating method is divided into a hard templating method and a soft templating method according to different sacrificial phases of templates. The template-free method mainly includes a thermally induced phase separation method and a batch foaming method.

According to the hard templating method, the structures of templates can be well replicated. However, the disadvantages such as complex processing routes, high cost, and environmental issues limit large-scale production of the method. Moreover, since the viscosity of polyacrylonitrile is high, its dispersion in templates is poor, and it is difficult for it to fill the entire volume spaces of monolithic materials, especially the narrow gaps between the templates, resulting in many defects in obtained porous carbon materials. Therefore, the hard templating method is difficult to apply to the preparation of polyacrylonitrile monolithic materials. Compared with the hard templating method, the soft templating method is simpler in process, but the controllability of pore structures is significantly lower than that of the hard templating method. In addition, high-viscosity polyacrylonitrile is difficult to synthesize block copolymer with a sacrificial phase, and phase separation mechanisms of polyacrylonitrile and polymers are still unclear. Therefore, no matter from the perspective of controllability, production cost or environmental protection, the hard templating method and the soft templating method are not effective methods for preparing polyacrylonitrile-based three-dimensional macroporous carbon monoliths.

Tian Ci's research on "Preparation of carbon foam by foaming method and templating method and characterization" disclosed a physical foaming method using mesophase asphalt, polyacrylonitrile, polyvinyl chloride and some resins as precursors. The precursors were put into a mold to prepare a molded product, then the molded product was put into an autoclave and heated under an inert atmosphere and high pressure to make the asphalt melt, at the same time, an inert gas was continuously introduced, the air was slowly discharged, then a porous asphalt foam was obtained, and finally, the porous asphalt foam was pre-oxidized and carbonized to obtain a carbon foam. However, the asphalt was used as the main material of the precursors to prepare the molded product, the molded product needed to be pressed and molded at a temperature higher than the melting temperature of the asphalt, and a hot-pressing process of pure polyacrylonitrile was not involved. Since the softening temperature and decomposition temperature of polyacrylonitrile are very close, polyacrylonitrile starts to soften and decompose at the same time when being heated to 220° C. or above, and the melting point of polyacrylonitrile is 317° C. Therefore, in order to ensure that polyacrylonitrile does not decompose, the hot-pressing temperature cannot be higher than its decomposition temperature. Therefore, polyacrylonitrile molded products cannot be prepared by this method.

Wu Qingyun, Xu Zhikang, et. al. published a paper entitled "Crystallizable diluent-templated polyacrylonitrile foams for macroporous carbon monoliths" in Polymer in 2013. First, polyacrylonitrile was used as the solute and dimethyl sulfone was used as the diluted phase to prepare a homogeneous solution, next, the system was cooled down to achieve phase separation, dimethyl sulfone was extracted out with deionized water, then deionized water was replaced with ethanol and hexane and drying was performed to prepare a polyacrylonitrile foam, and finally the polyacrylonitrile foam was pre-oxidized and carbonized to prepare a polyacrylonitrile-based three-dimensional macroporous carbon monolith. Moreover, the influence rule of dimethyl sulfone content on the pore shape and size was studied. The polyacrylonitrile foam has a honeycomb-like or channel-like pore structure depending on the content of dimethyl sulfone, but the honeycomb-like pore structure of the polyacrylonitrile foam is severely collapsed after carbonization. The pore structure obtained by the thermally induced phase separation method mainly depends on the morphology of the diluted phase, and the morphology of the diluted phase can usually only be adjusted by selecting different diluents and changing the ratio of the solution. Therefore, the controllability of the pore structure in the thermally induced phase separation method is low. Moreover, since polyacrylonitrile is only soluble in a few organic solvents and has low solubility, compared with other polymers, there are fewer diluents available for polyacrylonitrile and a dilution window is narrower. Therefore, it is also difficult to realize controllable preparation of polyacrylonitrile-based three-dimensional macroporous carbon monoliths by the thermally induced phase separation method.

Therefore, to achieve large-scale production of polyacrylonitrile-based three-dimensional macroporous carbon monoliths, how to solve the problem of hot-press molding of polyacrylonitrile below its decomposition temperature and the problems of complex preparation processes, high processing costs, poor environmental protection and uncontrollable pore structures of polyacrylonitrile-based three-dimensional macroporous carbon monoliths have become important technical problems to be solved in this field.

SUMMARY

In order to overcome the shortcomings above, the present invention provides a preparation method of a polyacrylonitrile-based three-dimensional macroporous carbon monolith and aims to solve the problem of hot-press molding of polyacrylonitrile below its decomposition temperature and the problems of complex preparation processes, high processing costs, poor environmental protection and uncontrollable pore structures of polyacrylonitrile-based three-dimensional macroporous carbon monoliths in the prior art.

In order to achieve the objectives above, the present invention adopts the following technical schemes:

One of the objectives of the present invention is to provide a preparation method of a polyacrylonitrile-based three-dimensional macroporous carbon monolith, including:
  dissolving polyacrylonitrile in an organic solvent and evaporating part of the solvent out to obtain sheets;
  cutting the sheets, hot-pressing the sheets into a block sample, and punching the block sample into small blocks to serve as a foaming precursor;
  physical foaming, pre-oxidizing and carbonizing the foaming precursor to obtain the polyacrylonitrile-based three-dimensional macroporous carbon monolith.

Chinese patent CN 103985881A disclosed a preparation method and application of a three-dimensional porous carbon foam scaffold electrode, but the present invention finds in subsequent researches that the technology has the following problems: first, precursor sheets directly prepared by culture dish have poor mechanical strength and are likely to bend and deform in subsequent foaming and molding processes; second, solvent retained in the sheets is likely to volatilize in the subsequent foaming and molding processes, so that the pore shape is irregular, the porosity is low, and the pore wall is thick; and third, in the subsequent supercritical carbon dioxide batch foaming process, the foaming temperature is too high, the saturation time is too long, and escaping and mutual aggregation of small solvent molecules may exist, resulting in a self-foaming phenomenon of the solvent in the polyacrylonitrile foaming process.

Therefore, this application attempts to use the hot-pressing process to make the precursor sheets into blocks to improve the overall strength, and the solvent is redistributed to ensure the uniformity of the block precursors. However, since the softening temperature (220° C. to 230° C.) of polyacrylonitrile is high, partial decomposition of polyacrylonitrile affects the subsequent foaming performance. Therefore, this application has conducted a systematic study on the hot-pressing process of polyacrylonitrile: it is found that hot-pressing at 140° C. to 160° C. can ensure that polyacrylonitrile does not decompose and has the best foaming performance in the subsequent foaming and molding processes. In addition, in order to enable all polyacrylonitrile sheets to be combined into a block precursor at 140° C. to 160° C., this application has explored the content of the remaining solvent in the polyacrylonitrile precursor and finds that the mass ratio of the remaining solvent to polyacrylonitrile should be controlled within a range of 35-55 wt %. In this case, the solvent in a mold has good fluidity and can be hot-pressed into a uniform and non-layered block precursor which is consistent with the shape of the mold cavity.

Therefore, the preferred hot-pressing condition of this application is: hot-pressing at 140-160° C. and 10-20 MPa for 10-20 min.

On the other hand, the precursor of the present invention is foamed at a low saturation temperature of 100-150° C., dimethyl sulfoxide will not volatilize quickly, and a plasticizing effect on foaming of polyacrylonitrile is realized. Therefore, a uniform pore structure can be obtained, the controllable range of saturation pressure is large, and the pore structure is adjustable and controllable.

Preferably, the organic solvent is at least one of dimethyl sulfoxide, dimethyl formamide or dimethyl acetamide.

Preferably, polyacrylonitrile is polyacrylonitrile powder or polyacrylonitrile fibers.

Preferably, material foaming adopts supercritical carbon dioxide as a physical foaming agent to prepare a microcellular polyacrylonitrile foaming material in an autoclave.

More preferably, the specific steps of material foaming include heating the autoclave to the foaming temperature of 100-150° C. first, then putting the precursor into the autoclave, introducing supercritical carbon dioxide into the autoclave, pressurizing the autoclave until the saturation pressure is 10.34-31.09 MPa, and after saturation for 1-3 h, quickly relieving the pressure to obtain the polyacrylonitrile foam.

Preferably, pre-oxidation is carried out under sufficient air conditions.

Preferably, carbonization includes two stages of low-temperature carbonization and high-temperature carbonization.

Preferably, carbonization is carried out under inert gas conditions.

The second objective of the present invention is to provide a polyacrylonitrile-based three-dimensional macroporous carbon monolith prepared by any of the methods above.

The third object of the present invention is to provide the application of any of the polyacrylonitrile-based three-dimensional macroporous carbon monoliths above in preparing electrode materials of fuel cells, double electric layer capacitors and lithium ion batteries, catalyst carriers, electromagnetic shielding materials and water purification and filtration or sound-absorbing materials.

Beneficial Effects of the Invention (1) The present invention mainly uses uniform mixing of supercritical carbon dioxide and the precursor at a nearly molecular level to prepare the honeycomb-like polyacrylonitrile foam with a uniform pore structure. The adjustable ranges of the pore density, average pore size and void fraction of the foam are as high as $1.157 \times 10^8$-$5.928 \times 10^{10}$ cells/cm$^3$, 5.34-51.43 μm and 74.8-93.8%, respectively. Further through pre-oxidation and carbonization treatment, the polyacrylonitrile-based three-dimensional macroporous carbon monolith is obtained. The pore structure of the polyacrylonitrile foam does not change in a pyrolysis process, the pore walls do not collapse, and after the same heat treatment, the shrinkage degrees of different pores are also very close. Because the polyacrylonitrile-based three-dimensional macroporous carbon monolith prepared by the present invention has low density and good conductivity, the pore structure is uniform and controllable, the preparation method is simple, the process conditions are mild, the method is environmentally friendly and low in cost. Thus, the present invention is conducive to large-scale production of the carbon monolith, and has a good application prospect. (2) The preparation method of the present invention is simple, the pore-creating efficiency is high, the practicability is high, and the method is easy to popularize.

BRIEF DESCRIPTION OF THE DRAWINGS

The accompanying drawings constituting a part of the present invention are used to provide a further understanding of the present invention. Exemplary embodiments of the present invention and descriptions thereof are used to explain the present invention, and do not constitute a limitation on the present invention.

DETAILED DESCRIPTION

Figure 1:
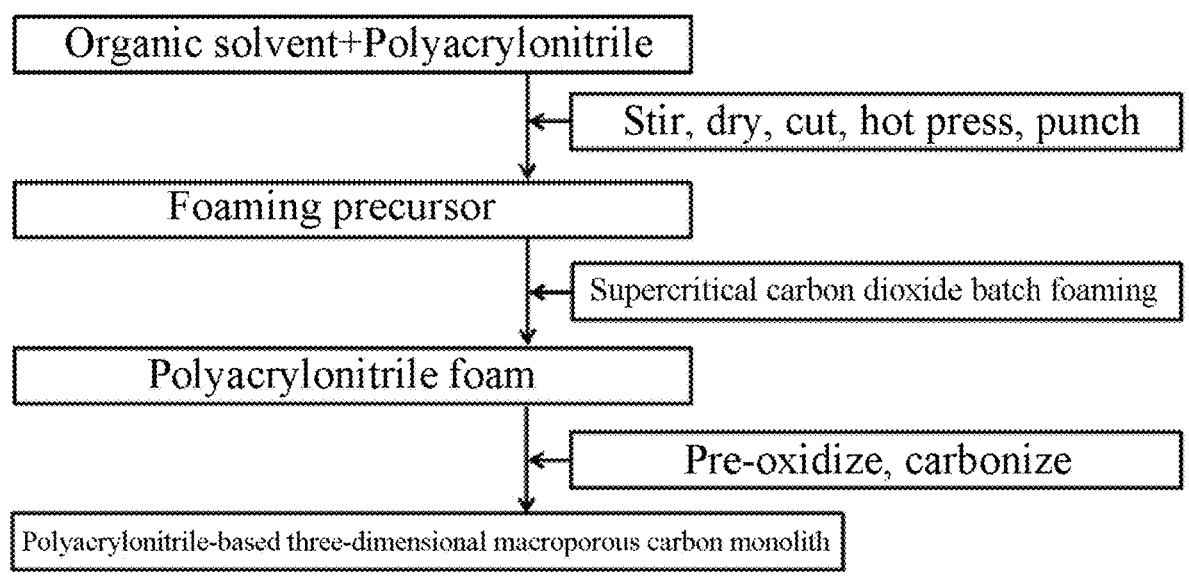
FIG. 1 is a process flow diagram of a preparation process of the present invention.
Figure 2:
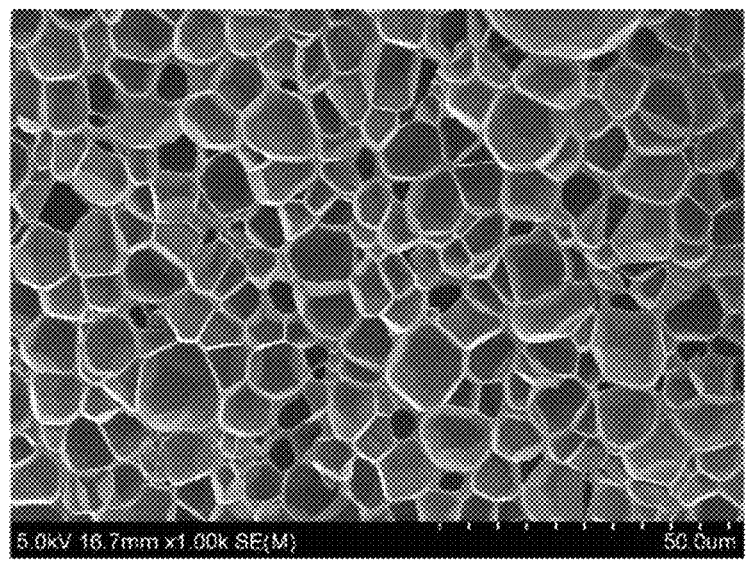
FIG. 2 is a scanning electron micrograph of a polyacrylonitrile-based three-dimensional macroporous carbon monolith prepared in Embodiment 1 of the present invention.
Figure 3:
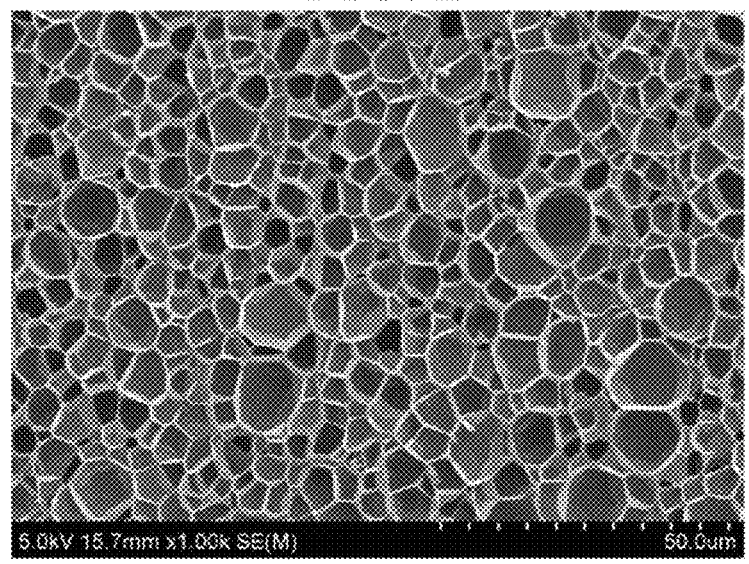
FIG. 3 is a scanning electron micrograph of a polyacrylonitrile-based three-dimensional macroporous carbon monolith prepared in Embodiment 2 of the present invention.
Figure 4:
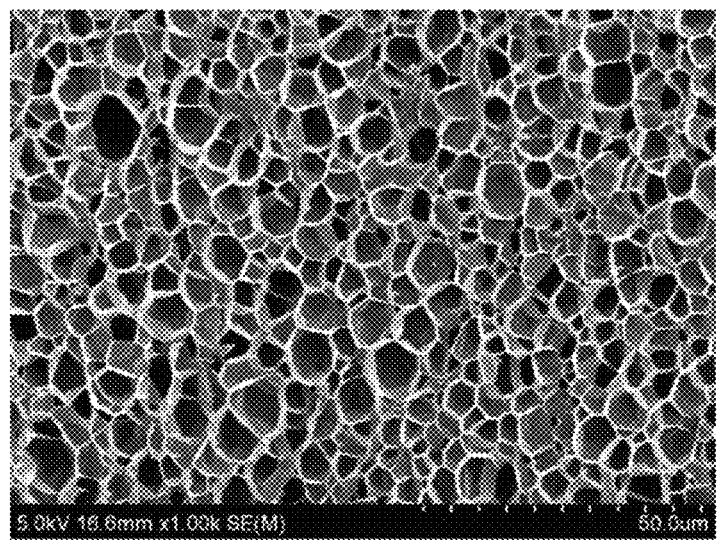
FIG. 4 is a scanning electron micrograph of a polyacrylonitrile-based three-dimensional macroporous carbon monolith prepared in Embodiment 3 of the present invention.

It should be noted that the following detailed descriptions are all exemplary and are intended to provide a further understanding of the present invention. Unless otherwise specified, all technical and scientific terms used herein have the same meaning as commonly understood by those of ordinary skill in the art to which the present invention belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

The following further describes the present invention with reference to specific embodiments.

The process of a preparation method of a polyacrylonitrile-based three-dimensional macroporous carbon monolith includes three steps of preparing a foaming precursor, preparing a polyacrylonitrile foam and preparing a polyacrylonitrile-based three-dimensional macroporous carbon monolith.

Specific steps are as follows:

(1) Preparation of a foaming precursor: after an organic solvent and 8-12 wt % polyacrylonitrile are added into a flask, the mixture is stirred at 55-75° C. for 8-24 h until polyacrylonitrile is completely dissolved, then the solution is poured into a culture dish and dried at 60° C. for 10-16 h, and after part of the solvent is evaporated, the mass ratio of the remaining solvent to polyacrylonitrile should be controlled within a range of 35-55 wt %.

Obtained sheets are cut into sheets with the same size as the cavity of a hot-pressing mold, 10-16 sheets are taken and hot-pressed at 140-160° C. and 10-20 MPa for 10-20 minutes to obtain a block sample, and finally the block sample is punched into small blocks to serve as the foaming precursor.

(2) Preparation of a polyacrylonitrile foam: supercritical carbon dioxide is used as a physical foaming agent, and foaming is carried out through a batch foaming device which consists of an autoclave, an ISCO high-pressure plunger pump and a PID-based temperature control system. The autoclave is heated to the foaming temperature of 100-150° C. first, then the precursor is put into the autoclave, supercritical carbon dioxide is introduced into the autoclave, the autoclave is pressurized until the saturation pressure is 10.34-31.09 MPa, and after saturation for 1-3 h, the pressure is quickly relieved to obtain the polyacrylonitrile foam.

(3) Preparation of a polyacrylonitrile-based three-dimensional macroporous carbon monolith: carbonization of polyacrylonitrile requires two stages of pre-oxidation and carbonization. In order to ensure that the polyacrylonitrile foam is fully oxidized, the foam is firstly cut into discs with the thickness of about 1-5 mm and then heated to 200-300° C. at a heating rate of 2-5° C./min in a blast drying oven under the condition of sufficient air, the temperature is kept for 1-5 h to carry out the pre-oxidation treatment. The carbonization process is divided into two stages of low-temperature carbonization and high-temperature carbonization, which are carried out in a tube furnace under the protection of an inert atmosphere. The low-temperature carbonization temperature is 300-600° C., the heating rate is 4-20° C./min, and the holding time is 0.5-4 h. The high-temperature carbonization temperature is 800-1000° C., the heating rate is 4-20° C./min, and the holding time is 0.5-4 h. The polyacrylonitrile-based three-dimensional macroporous carbon monolith can be obtained after carbonization.

According to the method for preparing the foaming precursor, the organic solvent is one of dimethyl sulfoxide, dimethyl formamide or dimethyl acetamide, or a mixture obtained by mixing more of dimethyl sulfoxide, dimethyl formamide and dimethyl acetamide at different ratios.

According to the method for preparing the foaming precursor, the polyacrylonitrile is polyacrylonitrile powder or polyacrylonitrile fibers.

According to the method for preparing the foaming precursor, the stirring is mechanical stirring or magnetic stirring.

According to the method for preparing the polyacrylonitrile-based three-dimensional macroporous carbon monolith, the inert atmosphere is nitrogen or argon.

The preparation of the polyacrylonitrile foam of the present invention adopts a batch foaming method. The principle is that a polymer is put in a certain atmosphere first, a gas is saturated in the polymer by controlling the temperature and pressure, then the pressure is quickly relieved or the temperature is raised, the gas nucleates and grows in the polymer due to supersaturation, and a polymer foaming material is formed. The principle is simple, the cost is low, the occupied space is small, the pore structure is uniform, the process parameters are easy to control, and large-scale production can be realized.

The preparation method of the polyacrylonitrile foam of the present invention adopts supercritical carbon dioxide as a physical foaming agent which has the advantages of environmentally friendly, non-toxic, low in cost, large diffusion coefficient, low viscosity and good permeability, thus, supercritical carbon dioxide can be evenly mixed with the polymer at a nearly molecular level, the gas-nuclei density is high in the foaming process, and the purpose of controlling the pore structure can be achieved.

Embodiment 1

The process of a preparation method of a polyacrylonitrile-based three-dimensional macroporous carbon monolith in this embodiment includes three steps of preparing a foaming precursor, preparing a polyacrylonitrile foam and preparing a polyacrylonitrile-based three-dimensional macroporous carbon monolith.

(1) Preparation of a foaming precursor: after dimethyl sulfoxide and 10 wt % polyacrylonitrile powder are added into a flask, the mixture is mechanically stirred at 60° C. for 10 h until polyacrylonitrile is completely dissolved, then the solution is poured into a culture dish and dried at 60° C. for 12 h (at this time, the mass ratio of the remaining solvent to polyacrylonitrile is about 42 wt %), obtained sheets are cut into sheets with the same size as the cavity of a hot-pressing mold, 12 sheets are taken and hot-pressed at 160° C. and 10 MPa for 10 minutes to obtain a block sample, and finally the block sample is punched into small blocks to serve as the foaming precursor.

(2) Preparation of a polyacrylonitrile foam: supercritical carbon dioxide is used as a physical foaming agent, and foaming is carried out through a batch foaming device which consists of an autoclave, an ISCO high-pressure plunger pump and a PID-based temperature control system. The autoclave is heated to the foaming temperature of 100° C. first, then the precursor is put into the autoclave, supercritical carbon dioxide is introduced into the autoclave, the autoclave is pressurized until the saturation pressure is 24.13 MPa, and after saturation for 1.5 h, the pressure is quickly relieved to obtain the polyacrylonitrile foam.

(3) Preparation of a polyacrylonitrile-based three-dimensional macroporous carbon monolith: carbonization of polyacrylonitrile requires two stages of pre-oxidation and carbonization. In order to ensure that the polyacrylonitrile foam is fully oxidized, the foam is firstly cut into discs with the thickness of about 2 mm and then heated to 250° C. at a heating rate of 5° C./min in a blast drying oven under the condition of sufficient air, the temperature is kept for 5 h to carry out the pre-oxidation treatment. The carbonization process is divided into two stages of low-temperature carbonization and high-temperature carbonization, which are carried out in a tube furnace under the protection of argon. The low-temperature carbonization temperature is 500° C., the heating rate is 5° C./min, and the holding time is 2 h. The high-temperature carbonization temperature is 800° C., the heating rate is 5° C./min, and the holding time is 2 h. The polyacrylonitrile-based three-dimensional macroporous carbon monolith can be obtained after carbonization.

The average pore size of the pre-oxidized foam of this embodiment is about 13.6% smaller than that of a PAN foam, and the average pore size of the carbonized foam is about 18.9% smaller than that of the PAN foam. The density of the macroporous carbon monolith carbonized at 800° C. is 0.156 g/cm$^3$, and the electrical conductivity at room temperature is 1.08±0.14 S/cm.

Embodiment 2

The process of a preparation method of a polyacrylonitrile-based three-dimensional macroporous carbon monolith in this embodiment includes three steps of preparing a foaming precursor, preparing a polyacrylonitrile foam and preparing a polyacrylonitrile-based three-dimensional macroporous carbon monolith.

(1) Preparation of a foaming precursor: after dimethyl sulfoxide and 10 wt % polyacrylonitrile powder are added into a flask, the mixture is mechanically stirred at 60° C. for 10 h until polyacrylonitrile is completely dissolved, then the solution is poured into a culture dish and dried at 60° C. for 12 h (at this time, the mass ratio of the remaining solvent to polyacrylonitrile is about 42 wt %), obtained sheets are cut into sheets with the same size as the cavity of a hot-pressing mold, 12 sheets are taken and hot-pressed at 160° C. and 10 MPa for 10 minutes to obtain a block sample, and finally the block sample is punched into small blocks to serve as the foaming precursor.

(2) Preparation of a polyacrylonitrile foam: supercritical carbon dioxide is used as a physical foaming agent, and foaming is carried out through a batch foaming device which consists of an autoclave, an ISCO high-pressure plunger pump and a PID-based temperature control system. The autoclave is heated to the foaming temperature of 130° C. first, then the precursor is put into the autoclave, supercritical carbon dioxide is introduced into the autoclave, the autoclave is pressurized until the saturation pressure is 24.13 MPa, and after saturation for 1.5 h, the pressure is quickly relieved to obtain the polyacrylonitrile foam.

(3) Preparation of a polyacrylonitrile-based three-dimensional macroporous carbon monolith: carbonization of polyacrylonitrile requires two stages of pre-oxidation and carbonization. In order to ensure that the polyacrylonitrile foam is fully oxidized, the foam is firstly cut into discs with the thickness of about 2 mm and then heated to 250° C. at a heating rate of 5° C./min in a blast drying oven under the condition of sufficient air, the temperature is kept for 5 h to carry out the pre-oxidation treatment. The carbonization process is divided into two stages of low-temperature carbonization and high-temperature carbonization, which are carried out in a tube furnace under the protection of argon. The low-temperature carbonization temperature is 500° C., the heating rate is 5° C./min, and the holding time is 2 h. The high-temperature carbonization temperature is 800° C., the heating rate is 5° C./min, and the holding time is 2 h. The polyacrylonitrile-based three-dimensional macroporous carbon monolith can be obtained after carbonization.

Embodiment 3

The process of a preparation method of a polyacrylonitrile-based three-dimensional macroporous carbon monolith in this embodiment includes three steps of preparing a foaming precursor, preparing a polyacrylonitrile foam and preparing a polyacrylonitrile-based three-dimensional macroporous carbon monolith.

(1) Preparation of a foaming precursor: after dimethyl sulfoxide and 10 wt % polyacrylonitrile powder are added into a flask, the mixture is mechanically stirred at 60° C. for 10 h until polyacrylonitrile is completely dissolved, then the solution is poured into a culture dish and dried at 60° C. for 12 h (at this time, the mass ratio of the remaining solvent to polyacrylonitrile is about 42 wt %), obtained sheets are cut into sheets with the same size as the cavity of a hot-pressing mold, 12 sheets are taken and hot-pressed at 160° C. and 10 MPa for 10 minutes to obtain a block sample, and finally the block sample is punched into small blocks to serve as the foaming precursor.

(2) Preparation of a polyacrylonitrile foam: supercritical carbon dioxide is used as a physical foaming agent, and foaming is carried out through a batch foaming device which consists of an autoclave, an ISCO high-pressure plunger pump and a PID-based temperature control system. The autoclave is heated to the foaming temperature of 110° C. first, then the precursor is put into the autoclave, supercritical carbon dioxide is introduced into the autoclave, the autoclave is pressurized until the saturation pressure is 31.09 MPa, and after saturation for 1.5 h, the pressure is quickly relieved to obtain the polyacrylonitrile foam.

(3) Preparation of a polyacrylonitrile-based three-dimensional macroporous carbon monolith: carbonization of polyacrylonitrile requires two stages of pre-oxidation and carbonization. In order to ensure that the polyacrylonitrile foam is fully oxidized, the foam is firstly cut into discs with the thickness of about 2 mm and then heated to 250° C. at a heating rate of 5° C./min in a blast drying oven under the condition of sufficient air, the temperature is kept for 5 h to carry out the pre-oxidation treatment. The carbonization process is divided into two stages of low-temperature carbonization and high-temperature carbonization, which are carried out in a tube furnace under the protection of argon. The low-temperature carbonization temperature is 500° C., the heating rate is 5° C./min, and the holding time is 2 h. The high-temperature carbonization temperature is 900° C., the heating rate is 5° C./min, and the holding time is 2 h. The polyacrylonitrile-based three-dimensional macroporous carbon monolith can be obtained after carbonization.

In summary, the preparation method of the polyacrylonitrile-based three-dimensional macroporous carbon monolith of the present invention is simple, mild in process conditions, environmentally friendly and low in cost and mainly uses uniform mixing of supercritical carbon dioxide and the precursor at a nearly molecular level to prepare the honeycomb-like polyacrylonitrile foam with a uniform pore structure. The adjustable ranges of the pore density, average pore size and void fraction of the foam are as high as $1.157 \times 10^8$-$5.928 \times 10^{10}$ cells/cm$^3$, 5.34-51.43 μm and 74.8-93.8%, respectively. Further, through pre-oxidation and carbonization treatment, the macroporous carbon monolith is obtained. The pore structure of the polyacrylonitrile foam does not change in a pyrolysis process, the pore walls do not collapse, and after the same heat treatment, the shrinkage degrees of different pores are also very close. Because the polyacrylonitrile-based three-dimensional macroporous carbon monolith prepared by the present invention has low density and good conductivity and the pore structure is uniform and controllable, the method is particularly suitable for large-scale production of high-quality macroporous carbon monoliths. Therefore, the present invention effectively solves the problems of the preparation methods of polyacrylonitrile-based three-dimensional macroporous carbon monoliths in the prior art, and has a high industrial use value and a good application prospect.

Finally, it should be noted that the foregoing descriptions are merely preferred embodiments of the present invention, and are not intended to limit the present invention. Although the present invention is described in detail with reference to the foregoing embodiments, those of ordinary skill in the art can still make modifications to the technical solutions described in the foregoing embodiments or make equivalent substitutions to some technical features thereof. Any modification, equivalent replacement, or improvement made within the spirit and principle of the present invention shall fall within the protection scope of this application. The specific implementations of the present invention are described above with reference to the accompanying drawings, but are not intended to limit the protection scope of the present invention. Those skilled in the art should understand that various modifications or deformations may be made without creative efforts based on the technical solutions of the present invention, and such modifications or deformations shall fall within the protection scope of the present invention.

What is claimed is:

1. A preparation method of a polyacrylonitrile-based three-dimensional macroporous carbon monolith, comprising:
   dissolving polyacrylonitrile in an organic solvent and evaporating part of the solvent out to obtain sheets;
   after part of the solvent is evaporated, a mass ratio of the remaining solvent to polyacrylonitrile should be controlled within a range of 35-55 wt %;
   cutting the sheets, hot-pressing the sheets into a block sample, and punching the block sample into small blocks to serve as a foaming precursor;
   physical foaming, pre-oxidizing and carbonizing the foaming precursor to obtain the polyacrylonitrile-based three-dimensional macroporous carbon monolith;
   wherein the hot-pressing condition is: hot-pressing at 140-160° C. and 10-20 MPa for 10-20 min;
   specific steps of the physical foaming comprise heating an autoclave to a foaming temperature of 100-150° C. first, then putting the foaming precursor into the autoclave, introducing supercritical carbon dioxide into the autoclave, pressurizing the autoclave until a saturation pressure is 10.34-31.09 MPa, and after saturation for 1-3 h, quickly relieving the pressure to obtain a polyacrylonitrile foam.

2. The method according to claim 1, wherein the organic solvent is at least one of dimethyl sulfoxide, dimethyl formamide or dimethyl acetamide.

3. The method according to claim 1, wherein polyacrylonitrile is polyacrylonitrile powder or polyacrylonitrile fibers.

4. The method according to claim 1, wherein pre-oxidation is carried out under sufficient air conditions.

5. The method according to claim 1, wherein carbonization is carried out under inert gas conditions.

* * * * *